(12) United States Patent
Agagliate et al.

(10) Patent No.: US 8,437,476 B2
(45) Date of Patent: May 7, 2013

(54) HYBRID METHOD FOR DISTRIBUTING KEYS FOR THE DIFFUSION OF ENCRYPTED DATA

(75) Inventors: Sandrine Agagliate, Paris (FR); Renaud Dubois, Paris (FR); Eric Garrido, Soisy/Montmorency (FR)

(73) Assignee: Thales, Neuilly sur Seine (FR)

( * ) Notice: Subject to any disclaimer, the term of this patent is extended or adjusted under 35 U.S.C. 154(b) by 880 days.

(21) Appl. No.: 12/296,316

(22) PCT Filed: Apr. 6, 2007

(86) PCT No.: PCT/EP2007/053436
§ 371 (c)(1),
(2), (4) Date: Feb. 18, 2009

(87) PCT Pub. No.: WO2007/116043
PCT Pub. Date: Oct. 18, 2007

(65) Prior Publication Data
US 2009/0196415 A1    Aug. 6, 2009

(30) Foreign Application Priority Data
Apr. 7, 2006 (FR) ...................... 06 03104

(51) Int. Cl.
H04L 9/08 (2006.01)
(52) U.S. Cl.
USPC ............................ 380/278; 380/281; 380/284
(58) Field of Classification Search ............. 380/44–47, 380/270–286
See application file for complete search history.

(56) References Cited

U.S. PATENT DOCUMENTS

| | | | |
|---|---|---|---|
| 6,240,188 B1 * | 5/2001 | Dondeti et al. | 380/284 |
| 6,275,859 B1 * | 8/2001 | Wesley et al. | 709/229 |
| 6,397,329 B1 * | 5/2002 | Aiello et al. | 713/155 |
| 6,684,331 B1 * | 1/2004 | Srivastava | 713/163 |
| 6,901,510 B1 * | 5/2005 | Srivastava | 713/163 |
| 6,993,138 B1 * | 1/2006 | Hardjono | 380/281 |
| 7,010,125 B2 * | 3/2006 | Lotspiech et al. | 380/242 |
| 7,039,803 B2 * | 5/2006 | Lotspiech et al. | 713/163 |
| 7,043,024 B1 * | 5/2006 | Dinsmore et al. | 380/278 |
| 7,272,229 B2 * | 9/2007 | Nakano et al. | 380/277 |
| 7,340,603 B2 * | 3/2008 | Asano | 713/163 |

(Continued)

OTHER PUBLICATIONS

Park et al. "On the Mean Number of Encryptions for Tree-Based Broadcast Encryption Schemes." Journal of Discrete Algorithms, Elsevier, vol. 4, No. 2, Apr. 25, 2005, pp. 215-238, XP005427470, ISSN: 1570-8667.

(Continued)

*Primary Examiner* — Christian Laforgia
(74) *Attorney, Agent, or Firm* — Lowe Hauptman Ham & Berner, LLP

(57) ABSTRACT

The invention relates to a method for broadcasting data in a system using a BES (A1) stateless scheme using a binary tree T with a KEKs No 2 key structure, i.e. such that a key $k_{i,j}$ is associated with each difference of subsets $S_{i,j}$, and a root key $k_{0,\_\_\_}$ associated with the set of the tree T and a BES (A2) "stateful" scheme using the same binary tree T with a KEKs No 1 key structure, i.e. such that a key $k_i$ is associated with each subtree $S_i$ wherein the scheme (A1) is used for the current broadcast session and the keys known by the denied users are updated with a "stateful" scheme (A2) from time to time.

5 Claims, 2 Drawing Sheets

N°2 key structure:
Procedure (A1): unlike subtrees

S(i) - S(j), here  the key L(i,j) = F(k(i,j); k(i)) is associated

U.S. PATENT DOCUMENTS

| | | | | |
|---|---|---|---|---|
| 7,346,170 | B2* | 3/2008 | Asano et al. | 380/278 |
| 7,590,238 | B2* | 9/2009 | Kamijoh et al. | 380/45 |
| 7,590,247 | B1* | 9/2009 | Dinsmore et al. | 380/278 |
| 7,593,528 | B2* | 9/2009 | Kamijoh et al. | 380/45 |
| 7,599,497 | B2* | 10/2009 | Soppera | 380/279 |
| 7,739,492 | B2* | 6/2010 | Kamijo | 713/150 |
| 7,757,082 | B2* | 7/2010 | Asano | 713/163 |
| 7,774,598 | B2* | 8/2010 | Chmora et al. | 713/163 |
| 7,813,510 | B2* | 10/2010 | Fu | 380/279 |
| 2002/0147906 | A1* | 10/2002 | Lotspiech et al. | 713/158 |
| 2004/0019795 | A1* | 1/2004 | Okaue | 713/189 |
| 2004/0156509 | A1* | 8/2004 | Nakano et al. | 380/281 |
| 2009/0310788 | A1* | 12/2009 | Garrido et al. | 380/279 |

OTHER PUBLICATIONS

Mihaljevic, M. J. et al. "Novel Method for Implementation of Certain Key Management Schemes to Minimize Secret Storage." Consumer Communications and Networking Conference, 2005. CCNC. 2005 Second IEEE Las Vegas, NV, USA Jan. 3-6, 2005, Piscataway, NJ, USA, IEEE, Jan. 3, 2005, pp. 54-59, XP010787610, ISBN: 0-7803-8784-8.

Shaoquan Jiang and Guang Gong. Hybrid Broadcast Encryption and Security Analysis. Cryptology ePrint Archive, Report 2003/241, 2003. http://eprint.iacr.org/.

David A. McGrew and Alan T. Sherman. Key Establishment in Large Dynamic Groups Using One-Way Function Trees. Manuscript, 1998.

Dalit Naor, Moni Naor, and Jeff Lotspiech. Revocation and tracing schemes for stateless receivers. Lecture Notes in Computer Science, 2139:41-62, 2001.

Debby M. Wallner, Eric J. Harder, and Ryan C. Agee. Key Management for Multicast: Issues and Architectures. Internet Request for Comment RFC 2627, Internet Engineering Task Force, 1999.

Chung Kei Wong, Mohamed Gouda, and Simon S. Lam. Secure group communications using key graphs. In Proceedings of the ACM SIGCOMM '98 conference on Applications, technologies, architectures, and protocols for computer communication, pp. 68-79. ACM Press, 1998.

"Key Management for Multicast: Issues and Architectures", RFC 2627, 1999.

* cited by examiner

N°1 key structure:
Procedure (A2): in subtree S(i), here the key k(i) is associated N°2 key structure:
Procedure (A1): unlike subtrees S(i) - S(j), here  the key L(i,j) = F(k(i,j); k(i)) is associated

HYBRID METHOD FOR DISTRIBUTING KEYS FOR THE DIFFUSION OF ENCRYPTED DATA

CROSS-REFERENCE TO RELATED APPLICATIONS

The present Application is based on International Application No. PCT/EP2007/053436, filed on Apr. 6, 2007, which in turn corresponds to French Application No. 0603104, filed on Apr. 7, 2006, and priority is hereby claimed under 35 USC §119 based on these applications. Each of these applications are hereby incorporated by reference in their entirety into the present application.

TECHNICAL FIELD

The present invention relates notably to a method for broadcasting data to various users registered in such a way that only the authorized users can access the information. The users, whether or not authorized, may change at each session.

The method relates generally to a data broadcast service for small bandwidth systems.

BACKGROUND OF THE INVENTION

Currently there are various broadcast schemes called "Broadcast Encryption Scheme" (BES) making it possible to broadcast data in a reliable manner. The principle of a BES is as follows. Each user u has a specific set I(u) containing several encryption keys called KEKs ("Key Encryption Keys"). At each session, the data are encrypted with a "session key", and the session key (and if necessary new KEKs keys) is encrypted with the KEKs keys such that each authorized user knows at least one of the keys used and the unauthorized (or "denied") users do not know any of the keys used.

The choice of the BES broadcast method determines the KEKs keys, their structure, the possibility of renewal and the choice of the KEKs keys used for the encryption for a given session.

To find a truly effective encryption when the data item is transmitted via a medium with very small bandwidth and when there are several possible "denied" users is a problem. The choice of the BES broadcast scheme may be critical, for example, if the data item is transmitted via satellites.

The prior art discloses several encryption schemes for the broadcasting of data, in particular two large types of schemes, the "stateless" schemes and the "stateful" schemes described below.

In a "stateless" scheme, all the KEKs encryption keys are distributed when the system is initialized. The KEKs keys are then static throughout the lifetime of the system and no other key is added. Only the session key may be changed. This means that, when a user loses the connection or that, for other reasons, he lacks the data packets using the KEKs keys, he cannot decrypt the payload content of the message (not knowing the current session key), but, when he has access to the next packets using KEKs keys, he will be able to retrieve the future keys of the session with no additional effort.

In a "stateful" scheme, the KEKs encryption keys may be updated or added thanks to key management messages. This means that, if the user lacks the key management packets, it may be impossible for him to decrypt the following session keys. Since it is possible for the users to lose data packets, a "stateful" scheme must be supplemented by a packet-retrieval mechanism. Usually, a "stateful" scheme may always be converted into a "stateless" scheme by including all the previous messages in each new message.

| Characteristic: Is each session independent of the state of the previous session? | Main advantage | Main disadvantages |
|---|---|---|
| "Stateless" scheme | YES Each session contains all the information from the past (denied users, new users, etc.) | A user may be disconnected from a station without losing the useful information for the next session | The size of the message potentially increases with each session |
| "Stateful" scheme | NO. Each session contains only the useful information that is new compared to the past | The size of the message does not in principle increase from one session to the next session | If a user is disconnected during a session, he may lose the useful information for the future sessions |

The most recent articles relating to a BES broadcast scheme use two main types of structure of KEKs encryption keys.

KEKs Structure No 1:

The first encryption key structure is a simple hierarchical tree. The users are represented by leaves of a tree T. This tree is not necessarily binary or balanced.

Each node $v_i$ of the tree is associated with a key $k_i$. The leaves are considered to be particular nodes. The keys $k_i$ are KEKs keys used in a BES. During initialization, each user u (that is to say each leaf u) receives the set of all the keys $k_i$ corresponding to the nodes $v_i$ belonging to the shortest path between the root of T and the leaf u. Therefore the key $k_i$ is distributed to each leaf of the subtree $S_i$ whose root is the node $v_i$ and only to these leaves. Any data item encrypted with the key $k_i$ is sent to the leaves of $S_i$ and only to these leaves. The root key is marked $k_0$ (that is to say the key associated with the root $v_0$ of the tree T) and the set of all the keys $k_i$ is marked $\{k_i\}$.

KEKs Structure No 2:

The second KEKs encryption key structure is also based on a hierarchical tree T such that each user is represented by a tree leaf. The tree is binary and a key $k_{i,j}$ is associated with a difference of subsets
$S_{i,j} = S_i - S_j$ such that the subtree $S_i$ contains the subtree $S_j$.
Each key $k_{i,j}$ is distributed for each leaf belonging to the subset $S_{i,j}$ (that is to say belonging to $S_i$ but not to $S_j$) and this key is used to encrypt any data item intended for all the users belonging to $S_{i,j}$ and only to them.
A key $k_{0,\_\_\_}$ is associated with the whole of the tree T and given to each of the users. $\{k_{i,j}\}$ is used to indicate the set of all the keys $k_{i,j}$ including the key $k_{0,\_\_\_}$.

Many BES broadcast methods, "stateful" or "stateless", use the KEKs No 1 structure as, for example, the CS method described in reference [3] or LKH described in one of the references [6], [5], [4-RFC-2627]. Several effective BES stateless methods use the KEKs No 2 structure, such as the "subset difference method" SD given in [3] or schemes derived from SD.

The prior art shows that the No 1 key structure is adapted to the "stateful BESs" scheme while the No 2 structure is better adapted to the "stateless BESs" scheme.

The authors in reference [1] propose two hybrid schemes which combine a "stateful" algorithm and a "stateless" algorithm, having the same KEKs key structure.

Hybrid Scheme Based on the Foregoing Schemes

A simple hybrid scheme mixes the CS "stateless" method described, for example, in reference [3] and the LKH "stateful" method (see references [6], [5], [RFC-2627]). If the CS method only is used to broadcast a message and if the number of "denied" users becomes very large, then the size of the broadcast session becomes very large. The main idea of the hybrid scheme described in [1] is as follows: usually, the CS stateless method is used, but when the number of denied users is greater than a fixed threshold, then the LKH stateful method is used to renew the keys known by the authorized users and the denied users. Therefore the set of the denied users is updated and the CS method is used again. The bandwidth used is therefore improved relative to that obtained when only the CS method is used.

The hybrid schemes described in the prior art however do not propose a solution making it possible to mix schemes each having different KEKs encryption key structures.

The idea of the present invention is based on a new hybrid scheme mixing a "stateless" procedure A1 and a "stateful" procedure A2 using various key structures.

SUMMARY OF THE INVENTION

The invention relates notably to a method for broadcasting data in a system using a BES stateless scheme (A1) using a binary tree T with a KEKs No 2 key structure, i.e. such that a key $k_{i,j}$ is associated with each difference of subsets $S_{i,j}=S_i-S_j$ where $S_i$ and $S_j$ are two subtrees such that $S_i$ contains $S_j$, and a root key $k_{0,---}$ associated with the set of the tree T and a BES "stateful" scheme (A2) using the same binary tree T with a KEKs No 1 key structure, i.e. such that a key $k_i$ is associated with each subtree $S_i$, characterized in that the scheme (A1) is used for the current broadcast session and the keys known by the denied users are updated with a "stateful" scheme (A2) from time to time, the set of keys allowing the broadcasting of the messages of the current session with the scheme (A1) being another set $\{L_{ij}\}$ determined from the two sets $\{k_{ij}\}$ and $\{k_i\}$.

The static keys $k_{i,j}$ and $k_{0,---}$ defined by the "stateless" procedures (A1) having a length in bits marked $N_s$, the dynamic keys $k_i$ defined by the "stateful" procedure (A2) have a length in bits marked $N_d$, the method uses a function F with the inputs in $\{0,1\}^{Ns}\times\{0,1\}^{Nd}$ and outputs in $\{0,1\}^{Ns}$, the function F is such that:

it is easy to calculate $z=F(x,y)$ from any (x,y) belonging to $\{0,1\}^{Ns}\times\{0,1\}^{Nd}$ for any triplet (x,y,z) such that $z=F(x,y)$, it is impossible to find z if no information on y is possessed, even if x is known, and it comprises at least the following steps:

a) for each index i of a node $v_i$ of the tree, and for each index j of a node $v_j$ belonging to the subtree $S_i$, the following variable keys are defined:

$L_{i,j}=F(k_{i,j}, k_i)$ calculated from the static key $k_{i,j}$ and the dynamic key $k_i$.

$L_{0,---}=F(k_{0,---}, k_0)$ calculated from the static key $k_{0,---}$ and the dynamic key $k_0$.

b) each session t, the data to be broadcast to the authorized users is marked $M_t$, and to broadcast $M_t$ with the "variable keys" (A1) is used, the user sends: $A1[M_t, (L_{i,j})]$, c) every T session, where T is a parameter, (A2) is used to renew the dynamic keys shared by the authorized and revoked users, and an item of information I(D) is sent giving the date D of the operational application of the set of renewed keys, i.e. send $A2[M, \{k_i\}, \{k'_i\}]$ and I(D), d) on the date D, the new set of keys $\{k'_i\}$, and consequently the set of keys $\{L_{i,j}\}$ is replaced by the new set $\{L'_{i,j}\}$ such that $L'_{i,j}=F(k_{ij}, k'_i)$.

The method is used for example for the broadcast of data comprising a satellite wireless navigation service protected each day t by a traffic key $K_T(t)$, each day t, a service supplies to the authorized users a message $M_t$ containing one or more future traffic keys giving potential access to the service S for the future days, and the message $M_t$ is broadcast by executing the steps described above.

The method according to the invention notably has the following advantages:
the ability to choose the methods (A1) and (A2) amongst the best performing methods, that is to say to choose a stateless method A1 having a No 2 key structure and a stateful method A2 having a No 1 key structure, and combine these two methods.

The stateless scheme (A1) is used for the current broadcast session. Therefore, between two messages A2, a user may have several errored messages A1 without failing in the decryption of the next message A1.

The stateful scheme (A2) is useful for two reasons: it renews the keys known by the revoked (for security reasons) users and it makes it possible to "reinitialize" all the revoked users (a reason for optimization of bandwidth).

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

Figure 1:
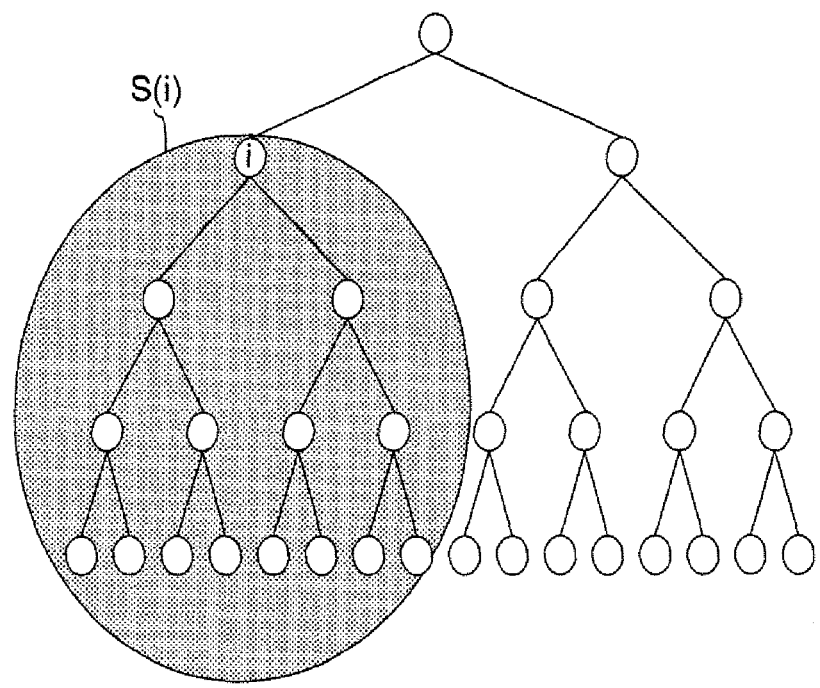
FIG. 1, a binary tree for A1 with the associated keys.
Figure 1:
Figure 2:
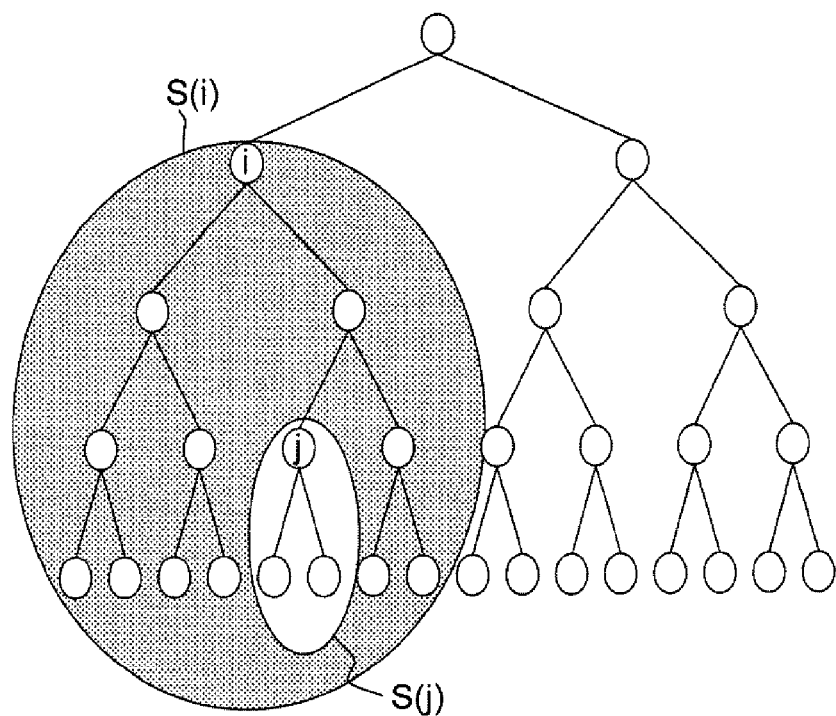
FIG. 2, a binary tree for A2 with the associated keys.
Figure 2:

In summary, the method according to the invention comprises, for example, the following steps:
1) choosing two schemes A1 and A2 defined below,
2) calculating the "variable" encryption keys from the "static" encryption keys and from "dynamic" encryption keys,
3) using schemes A1 and A2 with the "static", "dynamic" and "variable" encryption keys as explained below.

The invention makes it possible to mix two schemes, one stateless and the other stateful, having different key structures.

DETAILED DESCRIPTION OF AN EMBODIMENT OF THE INVENTION

In order to illustrate the method according to the invention, the example given is placed in the following situation:

1—consideration is given to a BES stateless scheme (A1) using a binary tree T with a KEKs No 2 key structure, i.e. such that a key $k_{i,j}$ is associated with each difference of subsets $S_{i,j}$, and a root key $k_{0,---}$ associated with the whole of the tree T. Like any "stateless" scheme, "the normal use" of (A1) for a given session consists in sending a formatted data item M in the message M' containing: the data item M encrypted by a session key and the session key encrypted by several KEKs keys belonging to the set $\{k_{i,j}\}$ such that only the users who are authorized for the session can decrypt the session key (making it possible to decrypt the data item M).
In particular, if there is no denied user, the session key is encrypted with the root key $k_{0,\_\_\_}$.

$$M'=A1[M,\{k_{i,j}\}].$$

2—consideration is given to a "stateful" scheme BES (A2) using the same binary tree T with a KEKs No 1 key structure, i.e. such that a key $k_i$ is associated with each subtree $S_i$.
Like any "stateful" scheme, "the normal use" of (A2) for a given session consists in sending a formatted data item M in the message M', containing: several new KEKs keys $k'_i$ (including a new root key $k'_0$) encrypted with current keys KEKs and the data item M encrypted by the new root key $k'_0$ (having the role of session key).
The new set $\{k'_i\}$ renews the KEKs keys shared by the denied users and the authorized users. This will be the set of the current KEKs keys for the next session.

$$M'=A2[M,\{k_i\},\{k'_i\}].$$

New Hybrid Scheme According to the Invention:

The idea of this hybrid scheme is to use an effective stateless scheme (A1) for the current broadcast session, and to update the keys known by the revoked users with an effective "stateful" scheme (A2) from time to time, for example when the number of revoked users becomes great.

The keys $k_{i,j}$ and $k_{0,\_\_\_}$ defined by the "stateless" procedures (A1) are called "static keys". Their length in bits is marked $N_s$.

The keys $k_i$ defined by the "stateful" procedure (A2) are called "dynamic keys". Their length in bits is marked $N_d$.

F is a function with inputs in $\{0,1\}^{N_s} \times \{0,1\}^{N_d}$ and outputs $\{0,1\}^{N_s}$. The function F is such that:
  it is easy to calculate $z=F(x,y)$ from any $(x,y)$ belonging to $\{0,1\}^{N_s} \times \{0,1\}^{N_d}$
  for any triplet $(x,y,z)$ such that $z=F(x,y)$, it is impossible to find z if the user has no information on y, even if x is known.

For example, if $N_s=N_d$, then F may be the function XOR, because if $z=x$ XOR y then the knowledge of x does not give information on z if y is unknown.
A harder condition to verify may be that F is a one-way function, i.e. for any given z, it is practically impossible by computation to find a pair $(x,y)$ such that $z=F(x,y)$.

For each index i of a node $v_i$ of the tree, and for each index j of a node $v_j$ belonging to the subtree $S_i$, the following keys are defined:
  $L_{i,j}=F(k_{i,j}, k_i)$ calculated from the static key $k_{i,j}$ and from the dynamic key $k_i$.
  $L_{0,\_\_\_}=F(k_{0,\_\_\_}, k_0)$ calculated from the static key $k_0$, and from the dynamic key $k_0$.

These new keys $L_{i,j}$ and $L_{0,\_\_\_}$ are called "variable keys". These keys have the same length as the static keys and are indexed in an identical manner.

These variable keys will replace the KEKs keys $k_{i,j}$ for the scheme (A1) in the hybrid scheme according to the invention.

Each session t, $M_t$ is marked as the data to be broadcast to the authorized users.

The hybrid scheme mixing (A1) and (A2) is as follows:
Each session t, the user uses (A1) to broadcast $M_t$ with the "variable keys" as KEKs, that is to say the user sends: $A1[M_t, \{L_{i,j}\}]$.
Every T session, where T is a parameter (fixed or able to vary), the user uses (A2) to renew the dynamic keys shared by the authorized and revoked users, and an item of information I(D) is sent giving the date D of the operational application of the set of renewed keys, i.e. sending $A2[M, \{k_i\}, \{k'_i\}]$ and I(D)

Unlike the "normal" use of A1, the user here uses A1 with the variable keys $\{L_{i,j}\}$ instead of the static keys $(k_{i,j})$, so that A2 allows a renewal of the keys used by A1.

On the date D, the set of dynamic keys $\{k_i\}$ is replaced by the new set $\{k'_i\}$. The variable keys used for (A1) depend on the dynamic keys and on the static keys. Therefore, on the date D, the set of variable keys $\{L_{i,j}\}$ is replaced by the new set and used for (A1).

The new hybrid scheme according to the invention is based on the following idea: use an effective stateless scheme (A1) for the current broadcast session and update the keys known by the denied users with an effective stateful scheme (A2) from time to time (every T sessions), for example when the number of denied users increases too greatly.

Comments on the parameter T:
  Comment 1: if the time between the sessions of the messages A1 is fixed (one session per day for example), and if the time between two messages A2 is fixed (T days for example) and known by the users, then the information I(D) is implicit and it is not necessary to transmit it,
  Comment 2: the number T of sessions between two messages A2 may change with the number of revoked persons. For example, a message A2 is transmitted when the number of revoked users reaches a threshold.

Example of Use of a Hybrid Scheme

The hybrid scheme may be used by an OTAR (Over The Air Rekeying) service with access control.

For example, if the assumption is made that a wireless navigation service by satellite is protected every day t by a traffic key $K_T(t)$, every day t, an OTAR service supplies to the authorized users a message $M_t$ containing one or more future traffic keys giving potential access to the service S for the future days.

Satellites have a very small bandwidth. The users must therefore organize themselves into user groups, and the groups are organized like leaves of a binary hierarchy tree.

The message $M_t$ may be broadcast using the hybrid scheme using the tree T, for example with the SD method described for example in reference [3] for (A1) and the OFT method explained in reference [2] for (A2).

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

REFERENCES

[1] Shaoquan Jiang and Guang Gong. Hybrid Broadcast Encryption and Security Analysis. Cryptology ePrint Archive, Report 2003/241, 2003. http://eprint.iacr.org/.
[2] David A. McGrew and Alan T. Sherman. Key Establishment in Large Dynamic Groups Using One-Way Function Trees. Manuscript, 1998.
[3] Dalit Naor, Moni Naor, and Jeff Lotspiech. Revocation and tracing schemes for stateless receivers. Lecture Notes in Computer Science, 2139:41-62, 2001.
[4]: "Key Management for Multicast: Issues and Architectures", RFC 2627, 1999.

[5] Debby M. Wallner, Eric J. Harder, and Ryan C. Agee. Key Management for Multicast: Issues and Architectures. Internet Request for Comment RFC 2627, Internet Engineering Task Force, 1999.

[6] Chung Kei Wong, Mohamed Gouda, and Simon S. Lam. Secure group communications using key graphs. In Proceedings of the ACM SIGCOMM '98 conference on Applications, technologies, architectures, and protocols for computer communication, pages 68-79. ACM Press, 1998.

The invention claimed is:

1. A method of broadcasting data in a system, said method implemented by a broadcast encryption apparatus, said method comprising:

using a stateless scheme (A1) that includes
- a binary tree T with a KEKs No 2 encryption key structure, wherein a key $k_{i,j}$ is associated with each difference of subsets $S_{i,j}=S_i-S_j$, $S_i$ and $S_j$ are two subtrees, and subtree $S_i$ contains the subtree $S_j$, and
- a root key $k_{0,---}$ associated with the binary tree T; and using a stateful scheme (A2) that includes
- a binary tree T with a KEKs No 1 encryption key structure, wherein a key $k_i$ is associated with each subtree $S_i$, wherein the stateless scheme (A1) is used for a current broadcast session, the keys known by denied users are updated with the stateful scheme (A2) from time to time, combining the stateless scheme (A1) and the stateful scheme (A2) to determine a set $\{L_{ij}\}$ from the sets $\{k_{ij}\}$ and $\{k_i\}$ of the stateless scheme (A1) and the stateful scheme (A2), respectively, wherein the keys $k_{i,j}$ and $k_{0,---}$ are static encryption keys defined by the stateless scheme (A1) and have a length in bits marked $N_s$, and the keys $k_i$ are dynamic encryption keys defined by the stateful scheme (A2) and have a length in bits marked $N_d$, using function F with inputs in $\{0,1\}^{Ns} \times \{0,1\}^{Nd}$ and outputs in $\{0,1\}^{Ns}$ to calculate $z=F(x,y)$ from any $(x,y)$ belonging to $\{0,1\}^{Ns} \times \{0,1\}^{Nd}$ and for any triplet $(x,y,z)$ wherein $z=F(x,y)$, it is impossible to find z if no information on y is possessed, even if x is known, for each index i of a node $v_i$ of the tree, and for each index j of a node $v_j$ belonging to the subtree $S_i$, defining the following variable encryption keys:

$L_{i,j}=F(k_{i,j}, k_i)$ calculated from the static encryption key $k_{i,j}$ and the dynamic encryption key $k_i$, $L_{0,---}=F(k_{0,---}, k_0)$ calculated from the static key $k_{0,---}$ and the dynamic key $k_0$, each session t, using the variable encryption keys of the stateless scheme (A1) to broadcast the data to the authorized users, wherein said data to be broadcasted is marked $M_t$, and $A1[M_t, \{L_{i,j}\}]$ is sent, each T session, where T is a parameter, using the stateful scheme (A2) to renew the dynamic keys shared by the authorized and revoked users, wherein an item of information I(D) is sent by giving the date D of operational application of the set of renewed encryption keys, and $A2[M, \{k_i\}, \{k'_i\}]$ and I(D) is sent, and on the date D, the set of keys $\{k'_i\}$, replacing the set of keys $\{L_{ij}\}$ with a new set $\{L'_{i,j}\}$ where $L'_{i,j}=F(k_{ij}, k'_i)$.

2. A method of broadcasting data according to claim 1 used in a satellite wireless navigation service, wherein said satellite wireless navigation service is protected each day t by a traffic key $K_T(t)$, and each day t, a service supplies to the authorized users a message $M_t$ to be broadcasted and containing one or more future traffic keys giving potential access to a service S for future days.

3. A method of broadcasting data according to claim 1 used in a satellite wireless navigation service, wherein said satellite wireless navigation service is protected each day t by a traffic key $K_T(t)$, and each day t, a service supplies to the authorized users the data $M_t$ containing one or more future traffic keys giving potential access to a service S for future days.

4. A method of broadcasting data according to claim 1, wherein the function F is a one-way function which is applies to the combined stateless scheme (A1) and stateful scheme (A2).

5. A method of broadcasting data according to claim 1, wherein the variable encryption keys $L_{i,j}$ and $L_{0,---}$ have same lengths as the static encryption keys $k_{i,j}$ and $k_{0,---}$ and are indexed in an identical manner.

* * * * *